Nov. 6, 1934.  C. H. WILKES ET AL  1,979,429
APPARATUS FOR MAKING SANDWICH ROLLS
Original Filed March 14, 1932  2 Sheets-Sheet 1
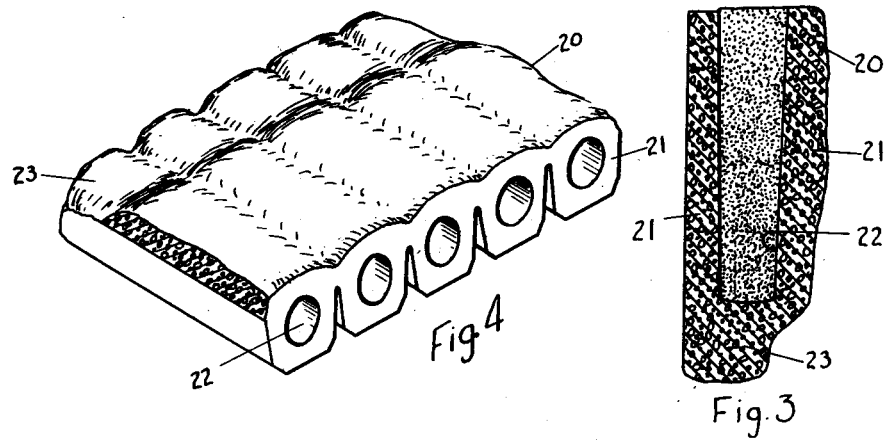
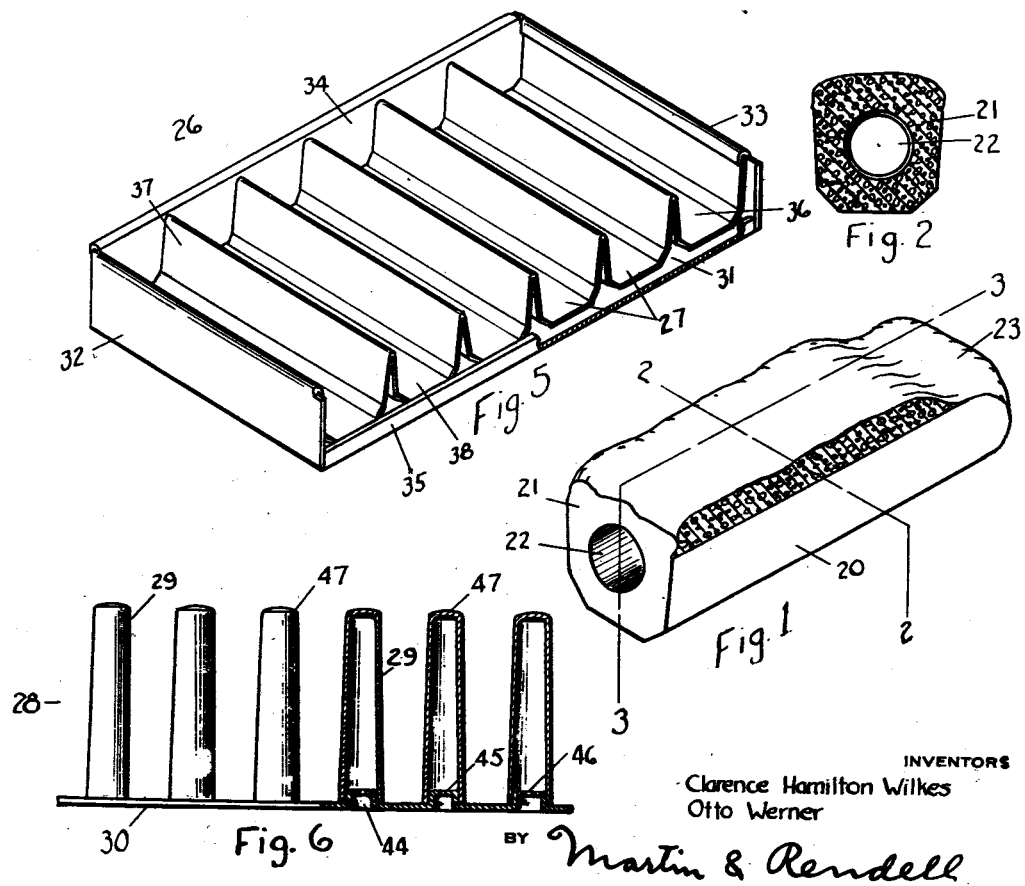
INVENTORS
Clarence Hamilton Wilkes
Otto Werner
BY Martin & Rendell
ATTORNEYS

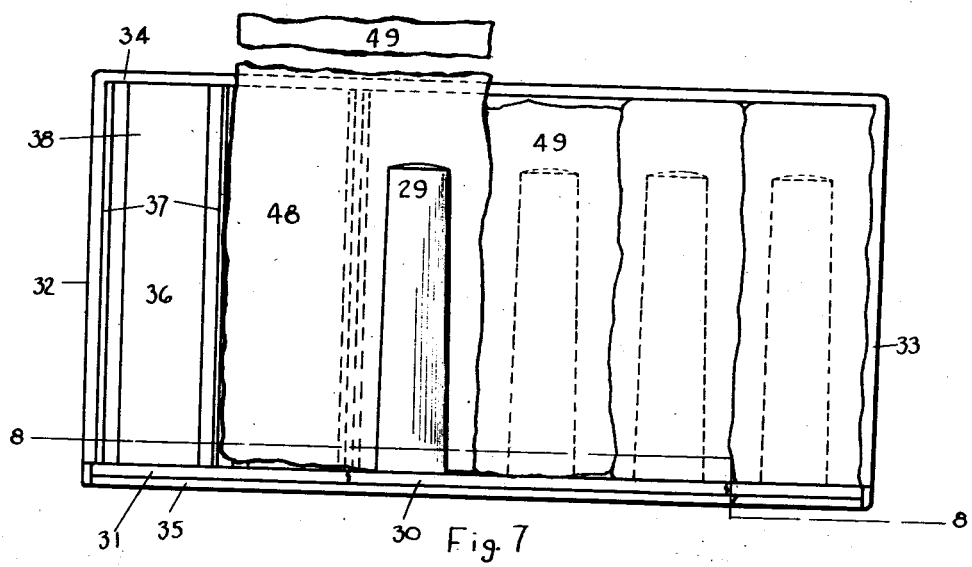
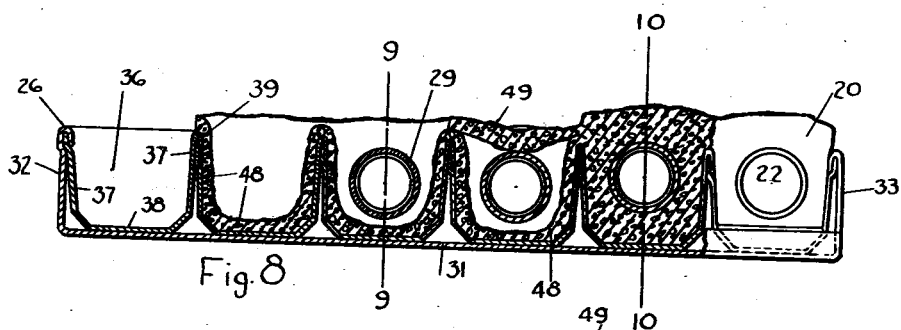
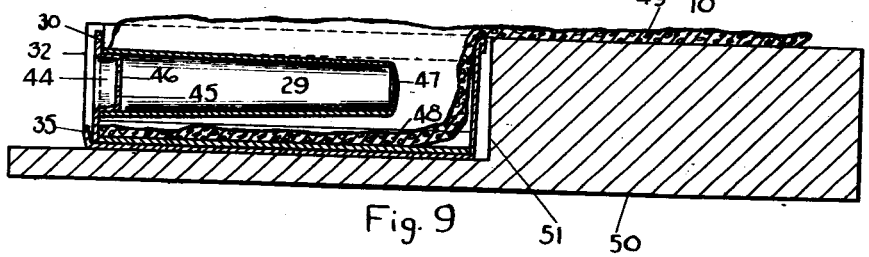
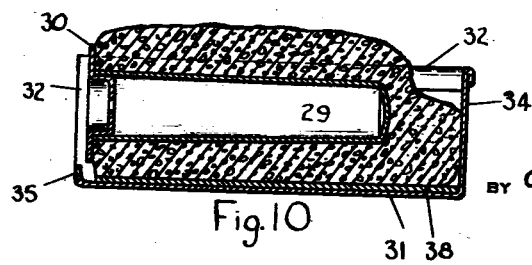

Patented Nov. 6, 1934

1,979,429

UNITED STATES PATENT OFFICE 1,979,429

APPARATUS FOR MAKING SANDWICH ROLLS

Clarence Hamilton Wilkes, Gloversville, and Otto Werner, Johnstown, N. Y.; said Wilkes assignor to said Werner Application March 14, 1932, Serial No. 598,710
Renewed August 2, 1934

8 Claims. (Cl. 53—6)

This application relates to the apparatus or special form of mechanism for the making of a sandwich roll in the shape of a complete integral tube closed at one end.

The purpose of our present invention is to provide a new, improved, effective but simple and durable apparatus for the making of sandwich rolls of the shape and character above mentioned.

A further particular purpose is to provide an apparatus of the character described which is of such form, shape and combination of parts as to be well adapted to rapidly, conveniently and accurately aid in the making of sandwich rolls of the character described and to have the parts of the apparatus so constructed and so shaped and combined relatively to its different parts that the parts of the apparatus may be readily placed in successive position as needed or taken apart as required and so that the lower layer of dough for a set of rolls may be readily placed in position in the set of troughs and so that the set of cores may then be quickly and accurately placed in position and have the upper layer of dough placed thereover and further to have the apparatus of such construction that opportunity is afforded for a core section to move upwardly as the dough raises and further to have the apparatus of such form that the set of cores may be readily removed from the set of rolls without breaking the rolls and so that thereafter the rolls may be removed from the set of troughs without distorting or breaking the rolls and without separating the rolls from the set.

Further purposes and advantages of this invention will appear from the specification and claims herein.

Fig. 1 is a perspective view of a roll in the baking position thereof which this apparatus is designed to produce.

Fig. 2 is a cross sectional view of such roll on line 2—2 of Fig. 1 and Fig. 3 is a longitudinal sectional view of said roll when in upright position and having its pocket or recess provided with a soft filling.

Fig. 4 is an isometric projection of part of a set of rolls, produced by the apparatus. Fig. 5 is an isometric projection of the pan shaped in the form of a series of troughs and Fig. 6 is a view partly in plan and partly in horizontal section of the set of cores, said two parts being combined as hereafter indicated to form the apparatus embodying this invention.

Fig. 7 is a top plan view of said apparatus on a scale slightly larger than Figs. 5 and 6, but with portions of certain parts removed to more clearly show the construction and with the dough in several positions to more clearly illustrate the use of the apparatus.

Fig. 8 is a vertical sectional view on line 8—8 of Fig. 7, but showing the two cores to the left removed and with the cores and dough in the rest of the drawings in different stages of the making of a roll.

Fig. 9 is a vertical sectional view on line 9—9 of Fig. 8.

Fig. 10 is a vertical sectional view on line 10—10 of Fig. 8.

A sandwich roll and the process of making the same for which this apparatus is specially designed are the subject-matter of a co-pending application. A brief description of the sandwich roll and of said process of making the same is necessary, however, in this application in order to clearly understand the construction and the apparatus for making said roll. As seen in Figs. 1 to 3 the sandwich roll has a large part of its body 20 in the form of a hollow portion or tubular portion 21 through that portion being provided with a deep recess or pocket 22. The recess 22 extends from one end of the roll about three quarters the length of the roll and from there on the tube is closed through the remaining length of the roll being a solid portion 23 where the walls preferably the bottom and top of the roll meet and merge. Preferably the said solid portion 23 of the roll is of less thickness as measured from top to bottom of the roll in its baking position than the rest of the roll and this thinned solid portion thus forms not only a solid and strong closure for this end of the roll but also forms a convenient handle for holding the roll between the fingers and thumb. The purpose of this special form of roll is to provide a roll which when positioned with the open end of the recess upwardly provides a complete and integral tubular roll the tube of which is closed at its lower end so that sandwich fillings containing semi-liquid or juicy fillings of any description may be placed in the recess without danger of spilling the same and the roll while thus positioned may be stored, exhibited, handled and eaten by successive bites from the top without loss of the contents and without spilling or squirting the liquid or semi-solid filling over a person's clothes.

The method of producing such a tubular roll closed at one end includes the holding of a lower layer of suitable dough in a trough-like shape preferably by placing it in a trough-shaped pan with the edges of this lower layer of dough for one roll extending upwardly at the sides of the trough, then placing over the dough in said trough a core 29 of approximately the size of the completed recess or pocket which core extends from one end of the roll about three quarters of the way to the other end and is spaced somewhat above the lower layer 48 of the dough therebeneath so as to give an opportunity for the dough even directly below the core to raise and so be light and palatable; then to place over the lower layer and core 29 the upper layer 49 of dough with the upper layer of dough resting upon and in direct contact with the upwardly extending portions of the lower layer of dough on either side of the core and also resting down upon the top of the whole width of the lower layer of dough at the end where the core does not over-lap the dough. Ordinarily the upper layer 49 of dough will rest along its central part upon the upper surface of the core. With the parts of the dough and the parts of the apparatus so positioned the dough is allowed to raise so as to integrally unite the contacting portions of the upper and lower layer of dough and so that the upper and lower layer of dough will together fill up the space between the trough of the pan and the core and preferably will raise the core bodily upward somewhat if necessary to allow for proper expansion of the dough during the raising. After the dough has raised sufficiently the apparatus and dough are placed together in the oven and baked with the core still in place in the recess of the roll. The baking further combines and merges the upper and lower layers so that the baked roll includes a complete and integral cylinder or tube closed at one end which we will call its lower end by an integral part of the roll. After the roll is baked the core is removed endwise from the recess of the roll and the roll is then ready to be sold and used.

In practice a considerable number of rolls are baked in one pan and this pan provides the necessary number of troughs arranged side by side to form the desired number of rolls and a set of cores is provided corresponding in number and spacing to the troughs of the pan. In the illustrations we have shown the parts of the pan, namely the pan proper and the set of cores for use therewith constructed to make six rolls. It will be understood of course that this is simply a convenient number for making and selling and that our invention applies as well to an apparatus that would make only one roll at a time and also applies to apparatus that might make any number as four, six, eight or a dozen rolls at one time.

Referring now more directly to the parts of the drawings showing the apparatus itself, it will be seen that the apparatus includes a pan 26 shown separately in Fig. 5 which included preferably permanently secured therein a set of troughs 27, conveniently and commonly but not necessarily first formed as a separate unit and then permanently fastened into the pan and, as a separate and removable unit, a core member 28 consisting of a plurality of cores 29 securely mounted and fastened at one end to a flat plate 30.

The said pan 26 consists of an ordinary rectangular baking pan having a bottom 31, opposite high sides 32 and 33, high back 34 and a front side 35 which is much lower, say one-quarter or one-third the height of the ends and rear of the pan.

The set of troughs 27 as clearly shown in Fig. 5 it will be seen consists of the desired number of troughs 36 arranged side by side with each trough open at both ends and with the troughs so formed and assembled as to be inserted as a unit and then fastened in place in the pan. Preferably each trough 36 has its two opposite sides 37 slope slightly outwardly as they extend upwardly so as the more readily to allow the rolls to be removed from the troughs. The lower portions of the sides of each trough join preferably integrally and merge either through a continuous curve or successive angles into the bottom 38 of the trough so that the lower portion of the roll will be more or less slanted or rounded to obtain the desired shape of the roll and also to assist in readily removing the rolls from the said troughed inner pan 27. Preferably each trough 27 will be made separately out of a piece of desired sheet metal bent, curved and folded into the shape approximately as shown in Fig. 5 so that the upper edge of the right hand side of a trough will have a flap 39 which is then closely folded over the top of the left hand wall of the trough to the right of the preceding trough. Thus the adjoining sides of any two adjacent troughs form an upstanding partition as seen in Figs. 5 and 8. These adjoining trough sides are slightly separated for most of the height of the sides and then taper away from each other towards their respective bottoms thus affording access for considerable heat of the oven to get to the sides 37 so that the sides of the rolls may be baked with a slight but not hard crust.

The set of desired number of troughs 27 thus assembled are then inserted in the shell of the pan 26 and permanently fastened thereto as by folding the extreme upper edges of the opposite pan ends 32 and 33 over the upper edges of the adjoining free sides of the two end troughs and by riveting or spot welding the bottoms 38 to the bottom 31 of the pan. The rear ends of the troughs fit closely against the rear side 34 of the pan but the front ends of the troughs are spaced from the front low side 35 of the pan by a distance a little greater than the thickness of the core plate 30 hereinafter mentioned for a purpose that will appear hereafter. Likewise the extreme front ends of the pan ends 32 and 33 project slightly beyond the front ends of the troughs.

In order to allow the core member 28 to be regularly, safely and quickly withdrawn from the baked rolls the individual cores 29 are formed with a slight taper so that the inner or free end of the cores are slightly smaller than the front or outer ends of the cores that are fastened to the core-supporting plate 30. A convenient form of assembling and fastening the cores 29 is to provide the core plate 30 with a series of rearwardly projecting bosses or very shallow cups 44 conveniently formed upon the plate by a drawing or punching process. The outer end of a core fits snugly onto the cylindrical walls of a boss 44 and may be permanently fastened thereto by denting in the wall of the core against the cylindrical wall of the boss as by a prick punch or the equivalent at a few places around the circle of the core. The original body of the core plate 30 still forms the bottom 45 of each boss and so reinforces the boss and the forward end of the core. Preferably in order to give access for the oven air to the inside of the core, a small aperture 46 is provided in the bottom 45 of each boss. The rear or inner end of each core 29 is formed with or provided with a rigidly fastened closure 47.

The core member 28 consisting of a set of cores 29 fixed on the single trough plate 30 is readily insertable and removable relative to the trough equipped pan 26 and when the core member is inserted in the pan the core member is held so that the core plate supplements the low front 35 to form a full front for the pan and the core plate is held in vertical position so that the cores 29 projecting into the pan are held in a horizontal position and spaced up from the bottom of the troughs preferably farther than the thickness of the lower layer 48 of dough that will be first placed in the troughs.

In the full embodiment of our invention the core member is also movable upwardly from its initial inserted position by the raising of the lower layer of dough and the parts of the apparatus are so arranged that this upward movement of the core member by the raising and baking of the dough is enough to lift the core plate 30 clear of the low front 35 of the pan so that after the baking is completed the core member may be removed from the rolls by simply drawing the core plate forwardly.

The core member is so held with its core plate vertical in the pan by the core plate slidingly fitting down into the space between the front ends of the troughs and the low front 35 of the pan with the lower edge of the plate resting against the bottom 31 of the pan. The forward extremities of the pan ends 32 and 33 form stops opposite the ends of the core plate 30 and so assure the central location of each core in its respective trough. As will be seen particularly in Fig. 9, the upper inner face of the core plate 30 rests against the front ends of the troughs and the front or outer face of the core plate engages the inner face of the low front 35 and thereby the inner ends of the cores are held horizontal, that is do not sag towards the pan. When the dough has raised and been baked into rolls, the raising of the dough not only raises the lower layer of dough up to the cores but raises the cores slightly by sliding the whole core member upwardly a short distance to approximately the position shown in Fig. 10 where the lower edge of the core plate 30 has become disengaged from the low front 35. By the time the dough has pressed the cores upwardly until the core plate is clear of the low front 35, the dough is strong enough to hold the cores horizontal.

In Figs. 7 and 8 there is illustrated somewhat diagrammatically the position of the parts of the apparatus and the lower and upper layers of dough at the different steps or stages of use of the apparatus. In each of these drawings the section, namely the first trough of the pan counting from the left is shown without the core in the trough and with no dough yet in place in the pan. The first step in the using of the apparatus is to place over the whole pan and its set of troughs the lower layer 48 of dough. This piece of dough extends from end to end of the trough-equipped pan and from front to rear of the troughs in the pan but not beyond the front end of the troughs and this lower layer of dough is so manipulated as to settle down into the different troughs more or less as indicated in the second and third troughs from the left as seen in Fig. 8. In other words, the dough rests upon the upper edge of the sides 37 and then extends down both sides 37 of each trough and across the bottom of the trough.

Then the removable and replaceable core member 28 is placed above the other part of the apparatus so that each core 29 projects along its corresponding trough from the front towards the rear thereof, but spaced above the lower layer of dough even at the bottom of the trough as clearly appears in the third and fourth troughs of Fig. 8 counting from the left. The placing of the core member 28 in this position brings the core plate 30 against the front of the pan and closes the front of the pan above the low front 35 so that the dough in raising or baking cannot expand to the front. As seen in the third trough of Fig. 7 counting from the left, the rear end of each core 29 does not reach to the end of the trough. The next step is to place over the assembled parts of the device and the lower layer of the dough the upper layer 49 of dough. This will be done so as to result in a positioning of the dough more or less as shown in the fourth trough or compartment of the apparatus counting from the left in Fig. 8. In other words, the upper layer of dough will rest directly upon and in contact with the lower layer of dough at the upper parts of the trough sides 37 so as to make an integral or merged joint of the two layers of dough along those lines and from those lines inwardly to the core as the dough raises and is baked and as is shown more or less diagrammatically in the fifth trough of Fig. 8. When this upper layer 49 of dough is placed over the cores in the lower layer of dough, the dough of the upper layer for each roll will raise and be supported upon the upper part of its core. In the raising of the dough the lower layer will raise upwardly and towards the core from each side of each trough and the upper layer 49 of dough will expand out to fill the space, perhaps moving downwardly somewhat to thoroughly merge with the lower layer.

As the separate cores 29 do not reach to the rear end of the troughs, the placing of the upper layer 49 of the dough over the rear end of the trough will allow this rear strip of the upper dough to sag downwardly into the troughs and into direct contact with the upper surface of the lower layer of dough to the rear of each core. This forms the basis of the solid integral and well merged rear end of the roll when in baking position or which solid end forms the thinner lower end or handle for the roll when in upright position as shown in Fig. 3.

It will be noted that the core member 28 and its core plate 30 are not positively fastened down at any place against the remaining parts of the pan. This is for the express purpose of allowing the whole core set to be moved upwardly slightly as necessary during the raising or raising and baking of the rolls due to the expanding or raising of the dough of the lower layer exerting enough pressure against the core member to raise said core member slightly. Such an upward position of the core member is indicated diagrammatically by the core in the fifth trough counting from the left in Fig. 8. It will be understood that this showing of course is diagrammatical to illustrate the upward position of the whole core member and does not mean that the individual cores move separately. Allowing the core member to thus move upwardly if necessary gives a margin of safety for safe baking so that even though the dough may vary from day to day or between different parts of a baking, there will still be room enough for the dough below the core and to the sides of the core to expand enough to prevent an undue arresting of the raising process.

With the apparatus thus assembled and with the two layers of dough in position, the dough will be allowed to raise in the usual way and then with the core member still in position will be baked. Immediately after the baking process has been completed the core member 28 is removed from the set of rolls in the pan by withdrawing the cores longitudinally thereof from the rolls. This is readily done by grasping the core plate and pulling outwardly thereupon. During this withdrawal of the core member, however, the rolls will remain in the trough unit and the outer pan and the narrow front 35 forms a stop bearing against the front of each rolls from the lower part of the core down to the bottom of the roll to prevent the rolls from moving longitudinally of themselves or forwardly of the pan when the core member is withdrawn. The position of the parts at this stage of the proceeding is shown diagrammatically in the sixth or extreme right hand trough of Fig. 8 which shows a front view of a baked roll with the core removed therefrom. After the core member has thus been removed from the set of rolls the rolls will be removed preferably bodily from the rest of the apparatus. As is suggested between the fourth, fifth and sixth rows, counting from the left, in Fig. 8 there is an appreciable thickness of roll toward the top of the said set of rolls over the top edge 36 of the sides 37 of the troughs. This thickness of baked dough is sufficient to hold the rolls together for baking, transporting and selling, but is still a narrow enough zone so that any roll may be readily broken from its adjacent roll in an obvious manner without breaking or distorting either of the rolls.

In Figs. 7 and 9 there is illustrated what we believe to be the preferred form of placing the dough in the pans by having a single piece of dough large enough to form the bottom layer 48 and also the upper layer 49 of dough, the upper layer being temporarily extended to the back of the pan until the core member is placed in position and then the upper layer is swung forwardly into position. With this method a stepped platform 50 may be used having the upper surface of the rear portion about on a level with the upper edge of the back of the pan as illustrated in Fig. 9. The back of this platform then provides a surface for temporarily resting the upper layer of dough while the core member is being placed in position. If desired, however, the two layers of dough may obviously be separate pieces with the upper layer placed directly over the core when brought to the pan.

A still further and third method of handling the upper layer is to place one end of the pan against the upright step 51 of the platform 5 and have a piece of dough long enough to form the bottom layer going down into the troughs as already described and have the extra piece of dough extend over the end of the pan next to the step 51 onto the upper level of the platform 50. The core member will then be placed in position as already described and the upper layer of dough 49 will be brought from the end instead of from the back of the pan and fitted down into contact with the dough at the sides of the trough and against the upper surface of the dough of the lower layer at the rear of the different cores.

What we claim as new and desire to secure by Letters Patent is:

1. In apparatus for making a plurality of sandwich rolls each in the shape of a complete integral tube closed at one end, the combination of a pan having high ends, a high rear side and a low front side and a plurality of troughs therein extending from front to rear of the pan and including upstanding partitions therebetween and as a separate removable and replaceable unit, a set of cores similar in number and lateral spacing to said troughs but shorter than said troughs and a plate secured to the front ends of said cores, said cores being adapted to be placed down into said troughs with the cores spaced upwardly from the troughs and with the rear ends of the cores spaced from the rear of the pan, said plate closing the front of the pan above said low front.

2. In apparatus for making a plurality of sandwich rolls each in the shape of a complete integral tube closed at one end, the combination of a pan having high ends, a high rear side and a low front side and a plurality of troughs therein extending from front to rear of the pan and including upstanding partitions therebetween and as a separate removable and replaceable unit, a set of cores similar in number and lateral spacing to said troughs but shorter than said troughs and a plate secured to the front ends of said cores, said cores being adapted to be placed down into said troughs with the cores spaced upwardly from the troughs and movable upwardly farther therefrom by the raising of the dough placed therebeneath, and with the rear ends of the cores spaced from the rear of the pan, said plate closing the front of the pan above said low front.

3. In apparatus for making a sandwich roll in the shape of a complete integral tube closed at one end, the combination of a pan having three high walls, a low front, a bottom and spaced, vertically arranged guideways at the front of the pan, and as a removable and replaceable unit a core member composed of a plate and a core, said core being mounted at its front on said plate, said core plate being removably placed in said guideways of the pan and at the lowermost position of the plate holding the core horizontally and spaced upwardly from the bottom of the pan, said core being shorter than the pan measured from front to rear and said plate when in position closing the low front of the pan.

4. In apparatus for making a sandwich roll in the shape of a complete integral tube closed at one end, the combination of a pan having three high walls, a low front, a bottom and spaced vertically arranged guideways at the front of the pan, and as a removable and replaceable unit a core member composed of a plate and a core shorter than the pan and mounted at its front end on said plate, said plate being slidably mounted in said vertical guideways and at the lowermost position of the plate holding the core horizontally and spaced upwardly from the bottom of the pan and with the plate closing the front of the pan, said plate being slidable upwardly and holding the core in substantially horizontal position as the core is moved upwardly by the raising of the dough below the core.

5. In apparatus for making a sandwich roll in the shape of a complete integral tube closed at one end, the combination of a pan having vertically disposed guideways near one edge and a removable and replaceable core shorter than the pan and placed horizontally in the pan with one end spaced from the adjacent end of the pan and means rigidly secured to the other end of the core and removably fitting said vertical guideways and holding the core horizontally and spaced upwardly from the bottom of the pan.

6. In apparatus for making a sandwich roll in the shape of a complete integral tube closed at one end, the combination of a pan having vertically disposed guideways near one edge and a removable and replaceable core shorter than the pan and placed horizontally in the pan with one end spaced from the adjacent end of the pan and means rigidly secured to the other end of the core and removably and slidingly fitting said vertical guideways and holding the core horizontally and spaced upwardly from the bottom of the pan whereby the core may be moved upwardly by the dough below the core raising and with the core still retained in substantially horizontal position by the engagement of said means with said guideways.

7. In apparatus for making a plurality of sandwich rolls each in the shape of a complete integral tube closed at one end, the combination of a pan having a plurality of parallel troughs and vertically disposed guideways near one end of the troughs, a removable and replaceable core member having cores similar in number and spacing to said troughs but shorter than said troughs and rigid means on said core member removably fitting said vertical guideways and holding the cores horizontally and spaced upwardly from the bottom of the pan.

8. In apparatus for making a plurality of sandwich rolls each in the shape of a complete integral tube closed at one end, the combination of a pan having a plurality of parallel troughs and vertically disposed guideways near one end of the troughs, a removable and replaceable core member having cores similar in number and spacing to said troughs but shorter than said troughs and rigid means on said core member removably and slidingly fitting said vertical guideways and holding the cores horizontally and spaced upwardly from the bottom of the pan whereby the cores may be moved upwardly by the raising of the dough below the cores and with the cores still retained in substantially horizontal position by the engagement of said means with said guideways.

CLARENCE HAMILTON WILKES.
OTTO WERNER.